US008002504B1

(12) United States Patent
Kochanowicz

(10) Patent No.: US 8,002,504 B1
(45) Date of Patent: Aug. 23, 2011

(54) ROCKER SLIDE LIFT ADJUSTMENT MECHANISM

(76) Inventor: Thomas Joseph Kochanowicz, Omaha, NE (US)

( * ) Notice: Subject to any disclaimer, the term of this patent is extended or adjusted under 35 U.S.C. 154(b) by 152 days.

(21) Appl. No.: 12/568,384

(22) Filed: Sep. 28, 2009

Related U.S. Application Data

(63) Continuation-in-part of application No. 12/509,417, filed on Jul. 24, 2009.

(51) Int. Cl.

| | |
|---|---|
| ***B23C 1/20*** | (2006.01) |
| ***B23C 1/06*** | (2006.01) |
| ***B27C 5/02*** | (2006.01) |
| ***B23Q 3/18*** | (2006.01) |
| ***B23Q 5/22*** | (2006.01) |

(52) U.S. Cl. ..... 409/210; 409/229; 409/206; 144/135.2; 144/286.5; 81/177.6; 81/125; 81/124.2

(58) Field of Classification Search .................. 409/182, 409/181, 229, 206, 210, 214, 218, 185; 144/136.95, 144/154.5, 286.1, 286.5, 135.2; 81/53.12, 81/177.6, 64, 125, 124.2

See application file for complete search history.

(56) References Cited

U.S. PATENT DOCUMENTS

| | | | | |
|---|---|---|---|---|
| 4,338,052 | A * | 7/1982 | Lockett | 409/206 |
| 5,139,061 | A * | 8/1992 | Neilson | 409/182 |
| 5,572,913 | A * | 11/1996 | Nasiell | 81/177.6 |
| 5,590,989 | A | 1/1997 | Mulvihill | |
| 6,948,892 | B2 * | 9/2005 | Hummel | 409/182 |
| 7,052,218 | B2 * | 5/2006 | Mussel | 409/182 |
| 7,334,614 | B2 * | 2/2008 | Cooper et al. | 144/136.95 |
| 7,588,400 | B2 * | 9/2009 | Taylor | 409/182 |
| 7,810,530 | B2 * | 10/2010 | Hummel | 409/206 |
| 2003/0223835 | A1 | 12/2003 | Hummel | |
| 2005/0163580 | A1 | 7/2005 | Mussel | |
| 2006/0102248 | A1 | 5/2006 | Cooper et al. | |

OTHER PUBLICATIONS

Nixon, John W., Motorized Router Lift, Feb. 21-22, 2009, East Lake Woodworking (Internet Site), http://www.eaglelakewoodworking.com/post/Motorized-Router-Lift.aspx.*

* cited by examiner

*Primary Examiner* — Erica E Cadugan

(57) ABSTRACT

A router lift adjustment mechanism for an inverted router (50, 52) mounted to a router table (92) comprising an assortment of attachments, FIG. 9 (98*a*, 98*b*, 98*c*, 98*d*) that engage the height adjustment mechanism of various types of routers. The routers height adjustment mechanism, the attachment's (98*a*, 98*b*, 98*c*, 98*d*), a flexible attachment holder (100), a driving shaft (104), and a rotatable adjustment mechanism, typically a hand wheel (122) are contiguously coupled respectively. The driving shaft is retained by a rocker drive guide (112) providing the driving shaft (104) the ability to rotate and slide to and fro within the bore of a bushing (114) lined within the rocker drive guide (112). Additionally, the rocker drive guide (112) hinges pivotably on the base mount (128) which is typically mounted to a stable surface. The rotatability, pivotability and slidability of the driving shaft (104) and rocker drive guide (112) assembly prevent any binding of the driving shaft (104) upon movement of the router adjustment mechanism; thus providing a quick, safe and stable method for adjusting the depth of a router bit (90). The present embodiment can be retrofitted to a wide variety of existing routers and adjustment apparatuses that rotate; including those that rotate and move spirally or provided as a feature of a newly manufactured router.

18 Claims, 12 Drawing Sheets

Rocker Slide Lift Utilizing a Rotational Energy Source in the form of a Motor to Displace the Depth of a Router Bit

Fig. 14

Rocker Slide Lift for Displacing the Depth of a Router Bit and Utilizing a Moveable Pointer Pointing to Indicia of the Driving Shaft

Fig. 15

ROCKER SLIDE LIFT ADJUSTMENT MECHANISM

CROSS-REFERENCE TO RELATED APPLICATIONS

This application is a continuation in part of pending application Ser. No. 12/509,417, filing date Jul. 24, 2009 by the present inventor.

FEDERALLY SPONSORED RESEARCH

None.

SEQUENCE LISTING

None.

BACKGROUND

1. Field

This application generally relates to rotational adjustments and particularly to a depth adjustment mechanism for a power tool, such as a router, planer, and the like.

2. Prior Art

This application relates generally to an adjustment mechanism for power tools and, more particularly, to an improved lift mechanism for adjusting the depth of a router mounted under a router table in an inverted position. This improved lift mechanism makes it easier to adjust the position of plunge and standard fixed base routers relative to the work supporting surface commonly known as a router table.

It is well known routers are popular power tools used by woodworkers. There are two main varieties of routers, standard routers, often called fixed base routers and plunge routers. The embodiment functions equally and similarly on both types of routers. The functionality will be described on a plunge router. A plunge router primarily consists of a motor mounted in a housing which drives a central shaft that engages a cutting bit. Many different types of cutting bits may be mounted to the central shaft and used for cutting different profiles in wood. A typical plunge router has a base mounted to it and is spaced apart from the router housing by one or more plunge rods fitted within recesses of the router housing. The distance between the housing and base are adjustable as the plunge rods act in a telescoping manner permitting the router housing and its cutting bit to slide along the plunge rods toward the base so that the cutting bit is brought into contact with the wood the base sits on. The base has a hole through which the cutting bit protrudes below the base into the wood being cut. The depth of the cut is set by adjusting the distance between the base and the router housing. Once the depth is set the woodworker drags the router across or into the wood to be cut.

To set the desired depth of the cut, a typical plunge router is equipped with a long, threaded adjustment rod which projects from the router base and through a portion of the router housing. To adjust the cutting depth, a woodworker rotates a nut along the threaded stop rod to set the depth of the cut the cutting bit makes. This adjustment is typically done with a wrench or a knob which engages the nut. These adjustments are easily done when the plunge router is used as a handheld tool.

Plunge routers have become popular with woodworkers that invert their plunge router, mounting them to the underside of a router table. This eliminates the need for the woodworker to handhold the router. The woodworker then feeds the material to be routed along the router table into the cutting bit. When so mounted it becomes awkward and time consuming to adjust the router bit depth from under the table.

One effort to reduce the difficulty of such adjustment contemplates the use of a flexible sleeve enclosing a threaded insert to which different driving socket mechanisms can be engaged, U.S. Pat. No. 5,590,989 to Mulvihill (1997) Flexible Router Height-Adjustment Mechanism. Nevertheless, the adjustment mechanism suffers from a number of disadvantages:

(a) The method is limited to plunge routers.

(b) The threaded sleeve engages the threaded adjustment rod. While this arrangement may decrease the awkwardness and difficulty of adjusting the router bit height relative to the router table, the mechanism does not have a mounting mechanism which can stabilize the adjustment drive method.

(c) Furthermore this method relies on a socket member having a socket opening to provide the driving purpose.

(d) Furthermore the same results can be attained with common mechanic tools, combining a socket with a flexible extension bit holder attached to a socket driver at a much lower cost.

(e) Additionally, the mechanism is structurally complex and expensive to manufacture and still requires additional socket driver attachments to be useful.

(f) The mechanism is limited to only router's having a threaded shaft adjustment mechanism.

(g) The flexible sleeve encloses a threaded insert which can interfere with the engaging threaded shaft adjustment mechanism when the flexible shaft is bent at an abrupt angle.

Another effort to reduce the difficulty of table mounted plunge router adjustment requires a special table plate attached to the top of the router table and a separate hand crank to perform adjustments, U.S. Pat. No. 6,948,892 B2 to Hummel (2005) Lift Mechanism for Plunge Routers. While this method is effective, it too suffers from a number of disadvantages:

(a) Installation is not always a simple modification to router tables that have solid surfaces, such as those made out of cast iron.

(b) Before the router table can be used, a hand crank has to be removed after each adjustment.

(c) The engagement mechanism which receives the hand crank risks being clogged with saw dust between adjustments.

(d) A hand crank can be easily misplaced within small wood parts when sawdust is expelled by the router.

(e) The mechanism can be dangerous because it requires the woodworker to be relatively close to the cutting bit to perform any adjustments from the top of the router table.

Another effort to reduce the difficulty of table mounted plunge router adjustment requires a major retrofit of a plunge router and is limited to only plunge routers, U.S. Pat. No. 7,052,218 to Christopher John Mussel (2006) Methods and apparatus for adjusting a plunge router. Furthermore the adjustment mechanism requires a cable to raise and lower a router which provides less stability and rigidity when adjusting the height of a router.

Another effort to reduce the difficulty of adjusting a non plunge router, U.S. Pat. No. 7,334,614 to Randy G. Cooper, Mark A. Etter, Greg K. Griffin, Ginger L. Allen, and Derrick Kilbourne of BLACK & DECKER INC. attempts to use a worm drive to adjust the height of the router. While effective, when mounted inverted to a router table, the design depends on an adjustment using a tool above the router table. Furthermore the router is a candidate for a retrofit for the present embodiment thereby enabling the router to be adjusted below the table, attaching to the routers rotating member. Consequently, as with the previous mentioned U.S. Pat. No. 6,948,892 B2 to Hummel (2005) Lift Mechanism for Plunge Routers, the engagement mechanism which receives the tool risks being clogged with saw dust between adjustments. Additionally, a tool required for adjustment can be easily misplaced within small wood parts and sawdust expelled by the router. As previously noted, this mechanism can also be dangerous because it requires the woodworker to be relatively close to the cutting bit to perform any adjustments from the top of the router table.

In conclusion, insofar as I am aware, no router adjustment mechanism for a table mounted router formerly developed provides the advantages of retrofitting a router to a router table as this present embodiment. These advantages include but are not limited to:

(a) Safety, no reaching under router table to make adjustments to power tool;
(b) no special template plate needed for router table;
(c) user can measure height of router bit while adjusting at the same time;
(d) no alteration required to router table top;
(e) works with both plunge and standard fixed base routers;
(f) quick smooth and accurate operation;
(g) no permanent modification to router;
(h) familiar adjustment mechanism for woodworkers, similar to adjusting a woodworkers table saw;
(i) permanent mount, no fumbling for attachment to make an adjustment;
(j) works with less complex and costly standard fixed base routers;
(k) adaptable to rotatable adjustments that move spirally.

SUMMARY

An adjustment mechanism according to the embodiment comprises a hand wheel attached to one end of a straight shaft, within easy reach of the woodworker. The opposing end of the shaft is inserted through the rocker drive guide. The rocker drive guide is lined with a bushing(s) that allows the shaft to rotate and slide to and fro within the bushing. Additionally the rocker drive guide pivots on a base mount allowing a rocking or "teeter-totter" motion relative to the stationary base mount. The base mount is mounted to a convenient location below the router table. The opposing shaft end is coupled to the lower end of a flexible extension attachment holder. The upper end of the flexible extension attachment holder is coupled to the lower end of an attachment that attaches to and adjusts the depth of the router's bit relative to the top of the router table. The flexible extension attachment holder allows the base mount to be mounted at various convenient angles relative to the position of the router. This allows the user to safely adjust the depth of a router bit from below the top of a router table by rotating the hand wheel clockwise or counter-clockwise. The rocking action can be controlled for standard fixed base routers that do not require the rocking movement of the rocker drive guide. A variety of attachments are provided to fit the router's depth adjustment mechanisms of standard fixed base routers and plunge routers.

For safety, the shaft's stop collar attached between the rocker drive guide and the lower end of the flexible extension attachment holder, controls to and fro movement of the driving shaft thereby preventing the user from disengaging the router bit depth adjustment mechanism. Additionally, a stop screw is provided to control the rocking action of the rocker drive guide.

Accordingly it will be appreciated that an adjustment mechanism according to the embodiment comprises a minimum number of component parts which are structurally interrelated in a manner that makes the operation thereof and thus the desired adjustment of a router bit relative to the router table extremely efficient and easy to achieve while, at the same time, providing for incremental adjustment and the ability to optimize accuracy with respect to a given adjustment.

It is accordingly an outstanding object of the present embodiment to provide an improved adjustment mechanism for adjusting the depth of a router bit relative to a router table beneath which the router is mounted.

Another object is the provision of an adjustment mechanism of the foregoing character which is operable from a mounted position from all sides of a router table.

A further object is the provision of an adjustment mechanism of the foregoing character which is structurally simple, easy to operate, efficient in operation and incrementally adjustable with accuracy.

Yet another object is the provision of an adjustment mechanism of the foregoing character by which the mechanism is easily adaptable to rotatable adjustment mechanisms that move spirally.

DRAWINGS

Figures

The foregoing objects, and others, will in part be obvious and in part pointed out more fully hereinafter in conjunction with the written description of embodiments illustrated in the accompanying drawings in which:

FIG. 14 is a schematic view illustrating a motorized rocker slide lift utilized to displace the depth of a router bit.

FIG. 15 is a schematic view illustrating a rocker slide lift for displacing the depth of a router bit and utilizing a moveable pointer pointing to indicia of the driving shaft.

DRAWINGS

Reference Numerals

| | |
|---|---|
| 20 | housing |
| 21 | power cord |
| 22 | bit chuck |
| 24 | base |
| 26 | plunge rods |
| 27 | adjustment dial |
| 28 | sub-base component |
| 30 | threaded fasteners |
| 32 | handles |
| 36 | threaded stop rod |
| 36a | upper end threaded stop rod |
| 36b | lower end threaded stop rod |
| 38 | abutment member |
| 40 | lock nuts |
| 42 | plunge lock lever |
| 50 | standard router |
| 52 | plunge router |
| 84 | router table top |
| 86 | router table fence |
| 88 | router table opening |
| 90 | router bit |
| 92 | router table |
| 97 | hose clamp |
| 98a | hex attachment |
| 98b | cup attachment |
| 98c | crimp attachment |
| 98d | threaded attachment |
| 100 | flexible extension attachment holder |
| 102 | flexible extension coupler |
| 104 | driving shaft |
| 104b | driving shaft shoulder |
| 104c | driving shaft hole |
| 105 | spring pin |
| 105b | spring pin hole |
| 106 | stop collar |
| 108 | table mounting bracket |
| 110 | attachment coupler |
| 110a | attachment coupler hole |
| 110b | crimp |
| 110c | spiral spring |
| 112 | rocker drive guide |
| 112a | rocker drive pivot hole |
| 112b | rocker drive stationary hole |
| 114 | bushing |
| 116 | pivot retainer pin |
| 120 | base mount hole |
| 120a | mounting screws |
| 122 | hand wheel |
| 122a | hand wheel hole |
| 124 | hand wheel handle |
| 126 | set screw |
| 127 | stop screw |
| 128 | base mount |
| 128b | base mount pivot hole |
| 128c | base mount stationary hole |
| 128d | optional stationary bolt |
| 130 | indicia |
| 132 | pointer |
| 150 | router table shelf |
| 152 | valve |

-continued

| | |
|---|---|
| 154 | valve handle |
| 156 | toggle switch |
| 158 | motor |

DETAILED DESCRIPTION

Figure 1:
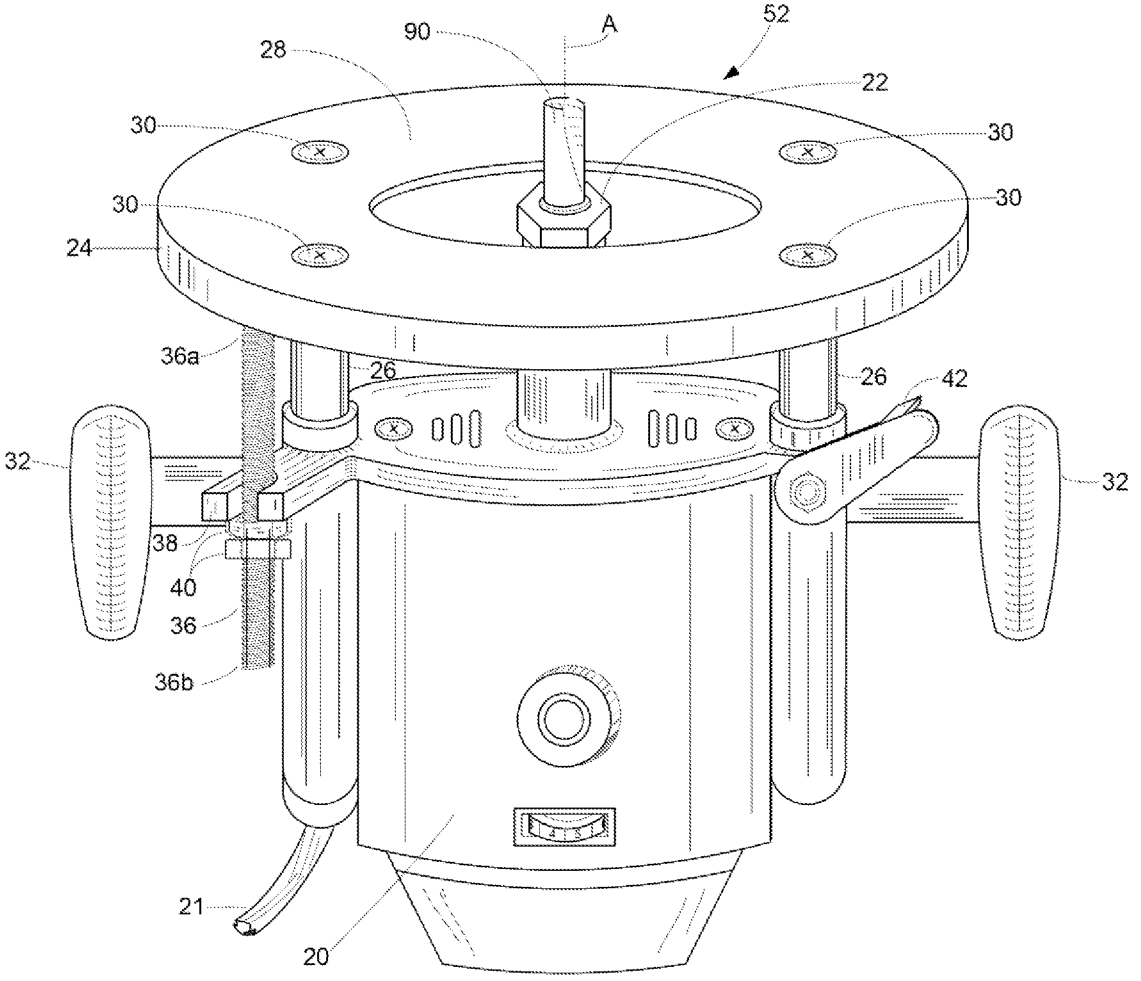
Prior Art Fig 1
FIG. 1 is a perspective view of a plunge router of the character to be provided with a lift mechanism in accordance with the present embodiment.

Referring now in greater detail to the drawings, wherein the showings are for the purpose of illustrating an embodiment only, and not for the purpose of limiting the embodiment:

FIG. 1 of the drawing illustrates a Hitachi Model M12V plunge router 52 and is shown only to provide an example of the type of router to which the present embodiment is applicable. As is well known, routers of the character shown in FIG. 1 are electric motor driven and include a housing 20 enclosing the electric motor which has a power cord 21 and an output shaft provided with a router bit chuck 22 for removably mounting a desired router bit on the router for rotation about the router axis A. The router further includes a base 24 mounted on the axially outer ends of a pair of plunge rods 26 which are axially slidably received in bores provided therefore in the housing 20, whereby the base 24 is axially displaceable toward and away from the housing 20. While not shown, it is well known that springs are interposed between plunge rods 26 and the bores therefore to bias the base 24 axially outwardly of the housing 20. The base 24 generally includes a sub-base component 28 in the form of a smooth plastic disk attached to the base 24 by a plurality of threaded fasteners 30. The sub-base component 28 provides a smooth surface for engaging with a piece of wood to be routed.

Generally, routers are hand operated and, for this purpose, the housing 20 is provided with a pair of diametrically opposed handles 32. It will be appreciated that FIG. 1 illustrates the router in an inverted position with respect to the position in which it would be during a hand routing operation. As is well known in connection with the latter, the position of the base 24 relative to the housing 20, and thus the plunge depth of a router bit relative to work being routed, is adapted to be adjusted through the use of a rotatable adjustment mechanism referred to as a threaded stop rod 36. The rotatable adjustment mechanism, in the router illustrated, further includes a threaded stop rod 36, an abutment member 38 on the housing 20, and lock nuts 40 and plunge rods 26. The threaded stop rod 36 has an upper end threaded stop rod 36*a* interconnected with the base 24 such as by threaded interengagement therewith and a lower end threaded stop rod 36*b* which receives lock nuts 40. The particular router illustrated in FIG. 1 further includes a plunge lock lever 42 which, as is well known, is adapted to releasably hold the base 24 in a given position relative to the housing 20 by releasably interengaging the housing 20 and one of the plunge rods 26. Such locking of the base 24 may be desired when changing a router bit or a plunge depth adjusting operation.

Figure 2:
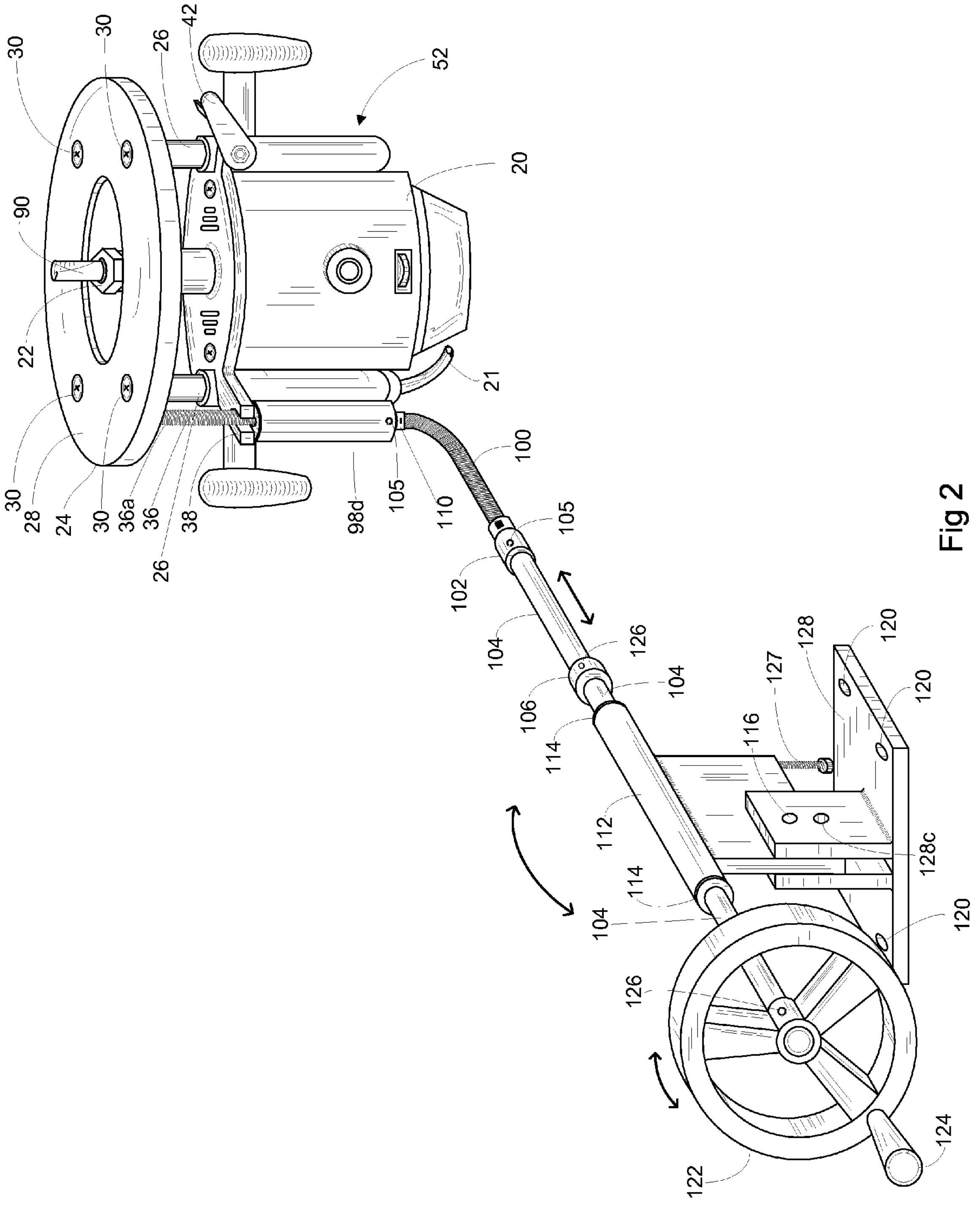
FIG. 2 is a perspective view from the side of the present embodiment as it would appear mounted to a router table.

FIG. 2 is a perspective view from the side of the present embodiment as it would appear mounted to a router table, illustrating the hand wheel handle 124 attached to hand wheel 122, secured to driving shaft 104 with set screw 126. The driving shaft 104 axially penetrates a brass bushing 114 which is encircled by rocker drive guide 112 and attached to base mount 128 and mounted to a surface with mounting screws 120*a*, not shown. Connection between rocker drive guide 112 and base mount 128 is accomplished with pivot retainer pin 116. Accordingly stop collar 106 is axially secured to driving shaft 104 with set screw 126. The driving shaft 104 is then coupled to flexible extension attachment holder 100 with flexible extension coupler 102 and secured with spring pin 105. The opposing end of the flexible extension attachment holder 100 is then coupled to the attachment coupler 110 and secured to the threaded attachment 98*d* by spring pin 105. The end of the threaded attachment 98*d* engages the rotatable adjustment mechanism, known as threaded stop rod 36. Notably the threaded attachment 98*d* is screwed onto the threaded stop rod 36.

Figure 3:
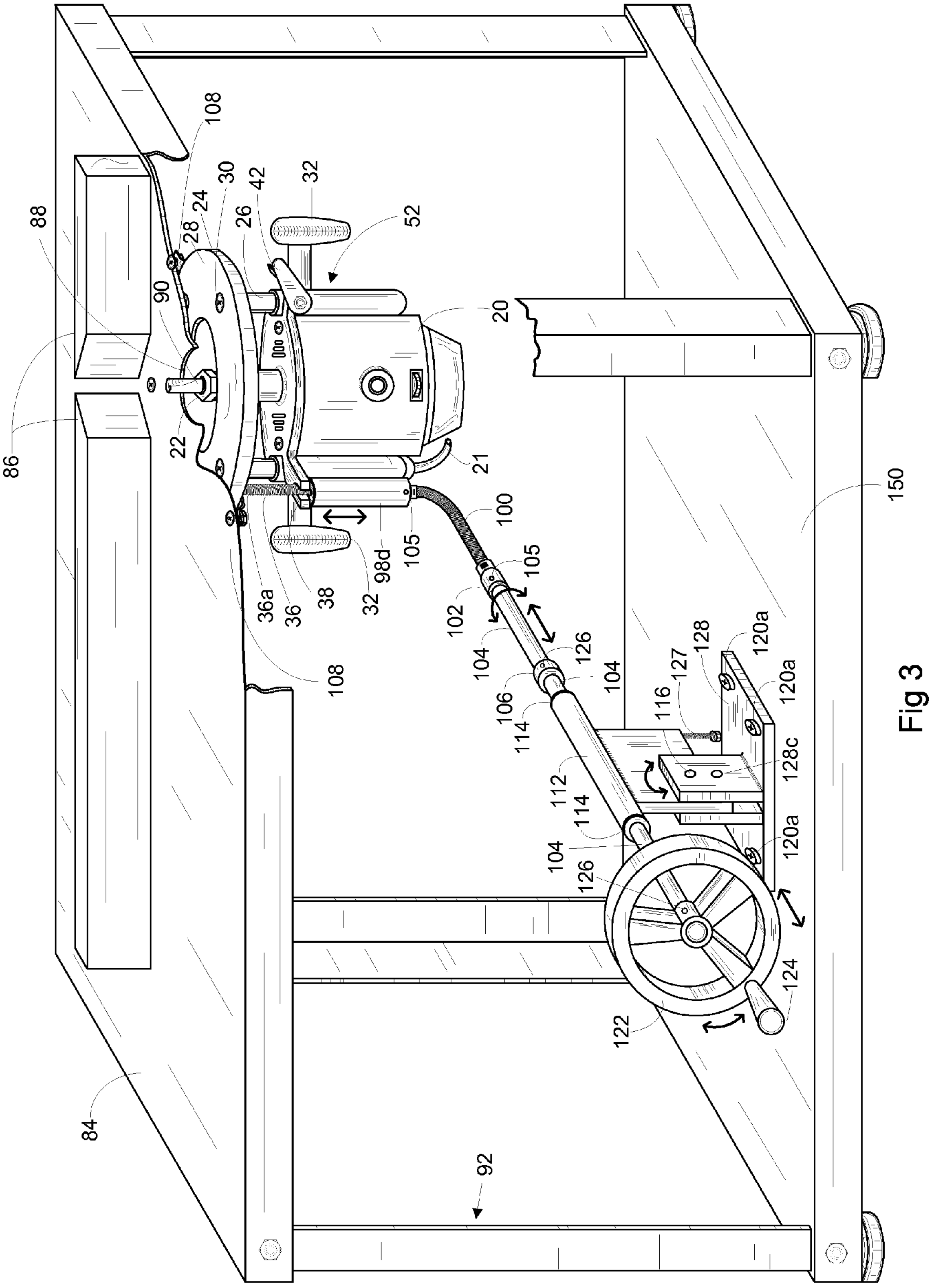
FIG. 3 is a perspective view taken from the front side of the present embodiment of FIG. 2, mounted in a router table with the router table quadrant "cut away" to appreciate mounting; and operation of embodiment.

FIG. 3 is a perspective view taken from the front side of the present embodiment of FIG. 2, mounted in a router table 92 with the router tables' front side quadrant "cut away" to appreciate mounting; and operation of embodiment. In continuation of description FIG. 2, base 24 is mounted to underside of router table top 84 and secured with table mounting bracket 108 securing router to underside of router table top 84. Router table opening 88 allows router bit 90 to protrude through table top. Router table fence 86 are guides for wood stock that make contact with the face of the fence and are common knowledge to the art. Note that router table fence 86 is adjustable and removable. Embodiment is secured to router table 92 on router table shelf 150 with mounting screws 120*a*. Notably embodiment is mountable from any side of router table 92 and view gives one example of placement of embodiment.

Figure 4:
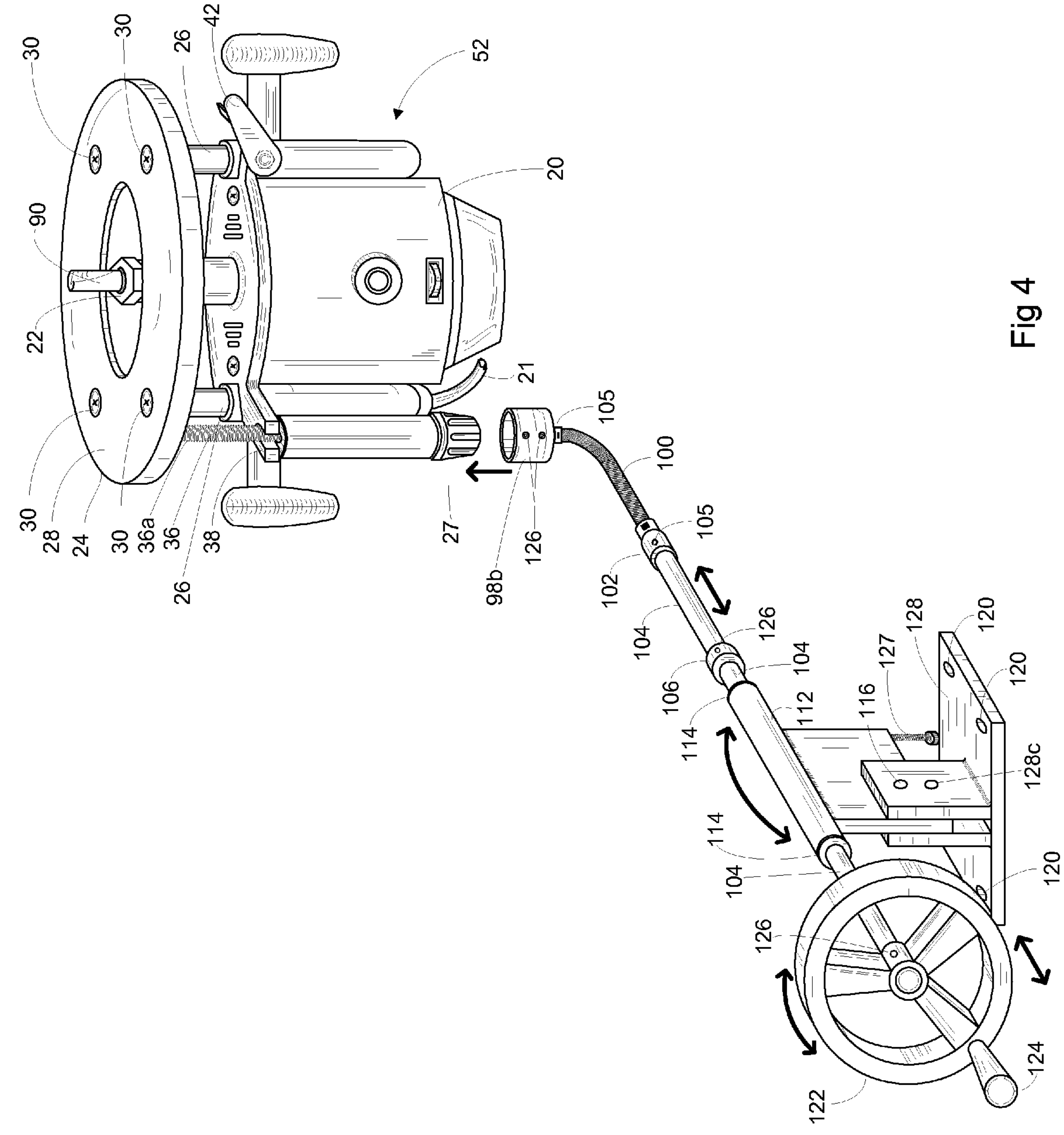
FIG. 4 is a perspective view of the present embodiment displaying one of many possible attachments to a plunge router.

FIG. 4 is a perspective view of a slightly modified embodiment of the present embodiment substituting a cup attachment 98*b* for routers equipped with a rotatable adjustment mechanism referred to in this view as an adjustment dial 27. The adjustment dial 27 typically functions similarly to the threaded attachment of 98*d* as shown in FIG. 1 and FIG. 2. That is, rotation of either result in adjustment of depth of the router bit 90 relative to the base 24. The router adjustment dial 27 attaches to the cup attachment 98*b* and is secured by set screws 126.

Figure 5:
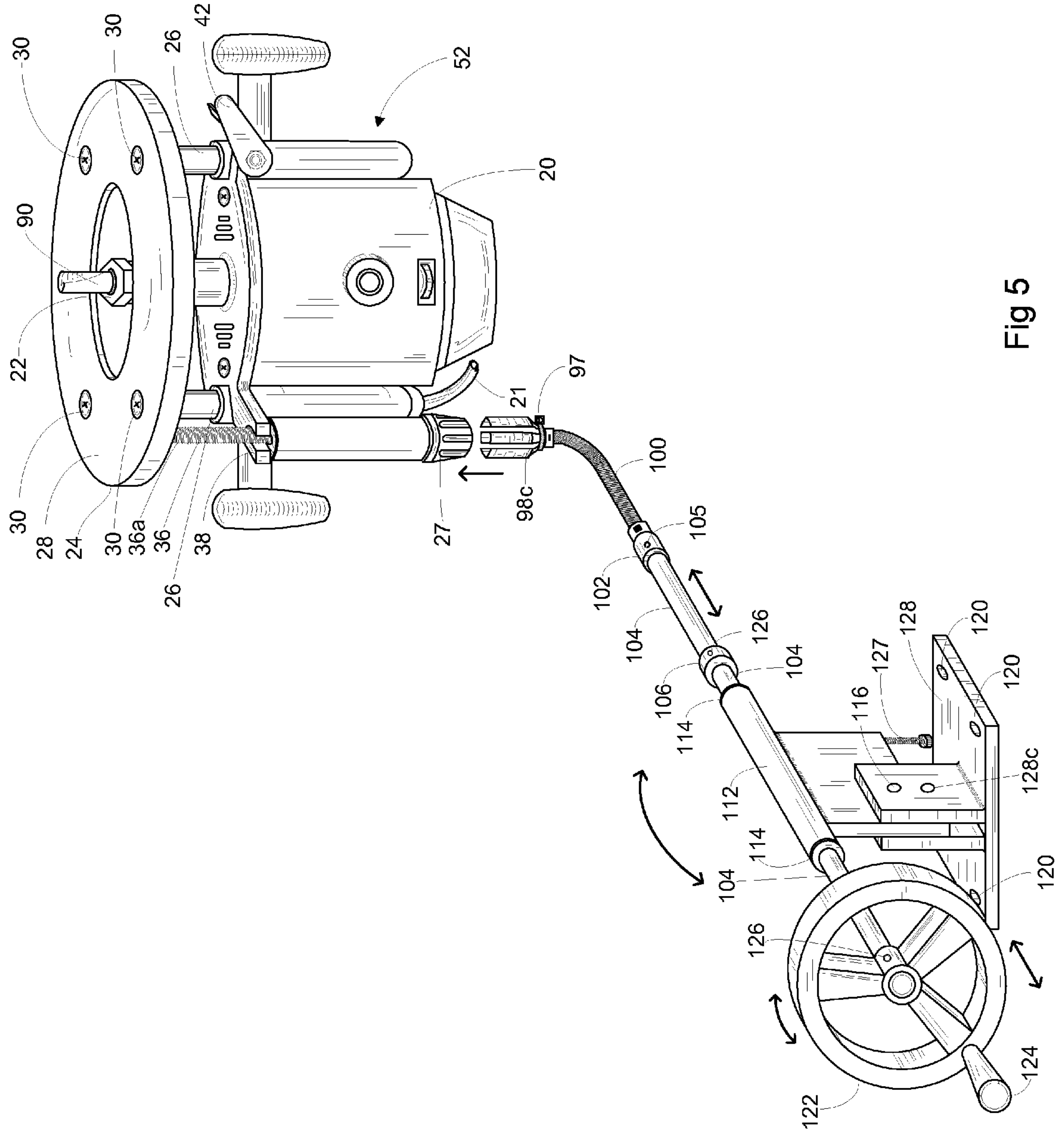
FIG. 5 is another perspective view of the present embodiment displaying another possible attachment to a plunge router.

FIG. 5 is a perspective view of a slightly modified version of the present embodiment substituting a crimp attachment 98*c* for a plunge router 52 equipped with an adjustment dial 27. Crimp attachment 98*c* couples to adjustment dial 27, secured by hose clamp 97. Furthermore illustrating the same functionality of described embodiment.

Figures 6, 7:
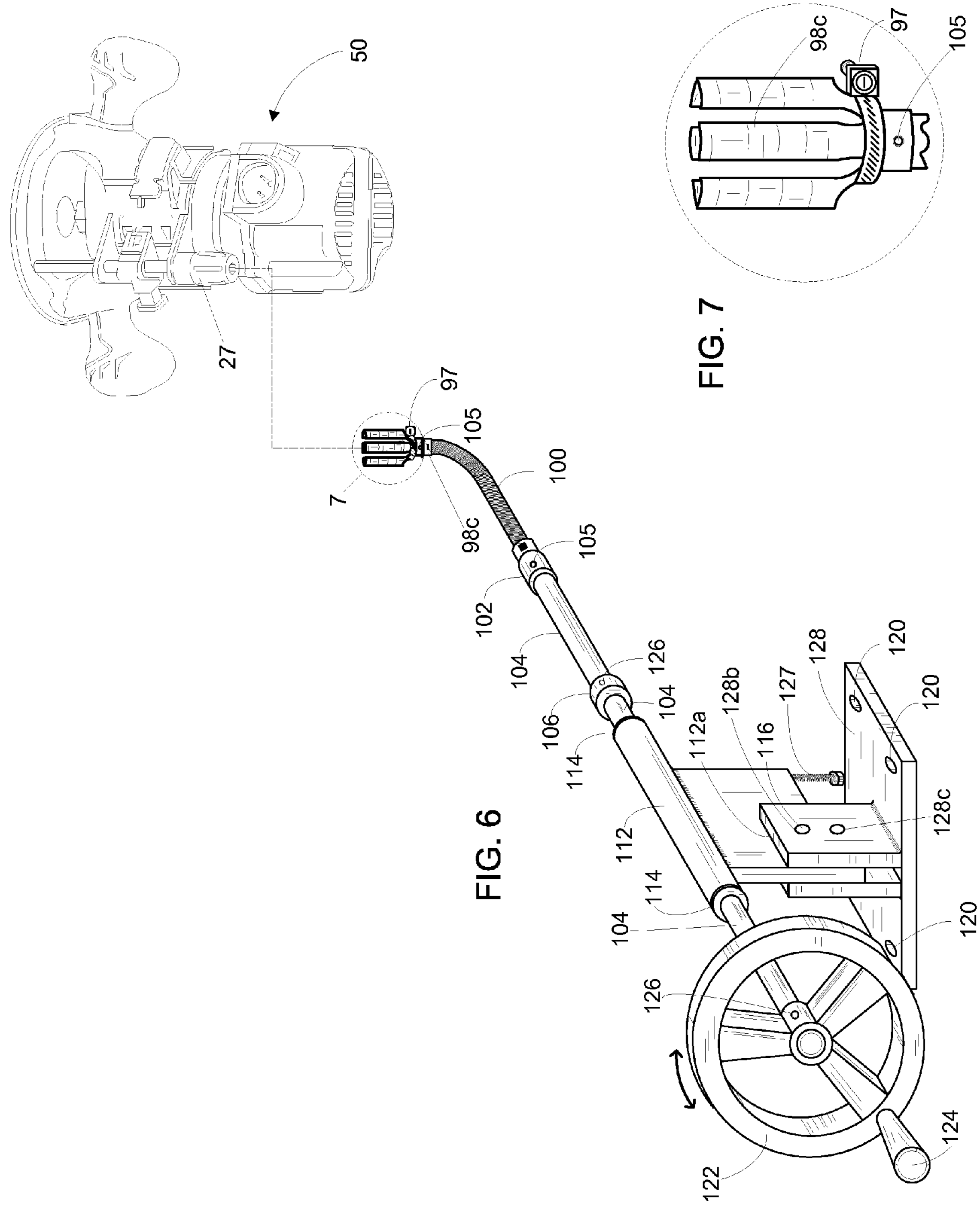
FIG. 6 is a perspective view of the present embodiment displaying one of many possible attachments to a standard fixed base router.
FIG. 7 is an enlarged detail of a partial view of FIG. 6.

FIG. 6 is the similar perspective embodiment as FIG. 5 operationally connecting to a standard router 50 equipped with a rotatable adjustment mechanism, referred to as adjustment dial 27. The crimp attachment 98*c* slips over the exposed end of adjustment dial 27 and is secured by tightening the hose clamp 97. Once secured, grasping hand wheel handle 124, and thereby rotating hand wheel 122 transfers rotational energy to the driving shaft 104, flexible extension attachment holder 100, crimp attachment 98*c* and adjustment dial 27, respectively. Set screw 126 secures hand wheel 122 to driving shaft 104. Spring Pin 105 secures driving shaft 104 to flexible extension attachment holder 100. The flexible extension attachment holder 100 secures to one end of the crimp attachment 98*c* using spring pin 105 and the other end connects to the adjustment dial 27. Rocker drive guide 112 bore is lined with bushing 114 allowing driving shaft 104 to rotate and slide to and fro within bore of bushings 114 freely. The rocker drive guide 112 attaches to base mount 128 with pivot retainer pin 116 pressed into first side of base mount pivot hole 128*b*, through rocker drive pivot hole 112*a*, not visible, and flush with opposite end of base mount pivot hole 128*b*, not visible. It should be appreciated that press fit of pivot retainer pin 116 is flush with both ends of base mount pivot hole 128*b* and rocker driver guide 112 rocker drive pivot hole 112*a* hinges freely on pivot retainer pin 116. Base mount 128 is equipped with base mount holes 120 for fastening with common screws or nut and bolt combination to a secure surface. To adjustably limit the to and fro movement of the driving shaft 104 and thereby the possibility of disengagement of the crimp attachment 98*c* from the adjustment dial 27, a stop collar 106 fastens to the driving shaft 104, secured with set screw 126. The stop collar 106 is adjustable to any unoccupied location on the driving shaft 104. Likewise a stop screw 127 is threaded to the underside of the rocker drive guide 112 to limit its range of pivotal motion.

It should be appreciated that most standard routers 50, due to their lack of plunge rods (FIG. 5) 26, do not always require the embodiment's driving shaft 104 to move to and fro, nor the rocker drive guide 112 to hingeably move relative to the base mount 128. Therefore, after the embodiment has been installed, stop collar 106 can be positioned on the driving shaft 104 to abut against its nearest end to the rocker drive guide 112 and stop screw 127 can be adjusted to abut against the base mount 128 thereby eliminating unneeded movements.

FIG. 7 is an enlarged detail of a partial view of FIG. 6 detailing the crimp attachment 98*c*. A hose clamp 97 is provided to enable adjustable gripping of the crimp attachment 98*c* to the adjustment dial 27 of FIG. 6.

Figures 8, 9:
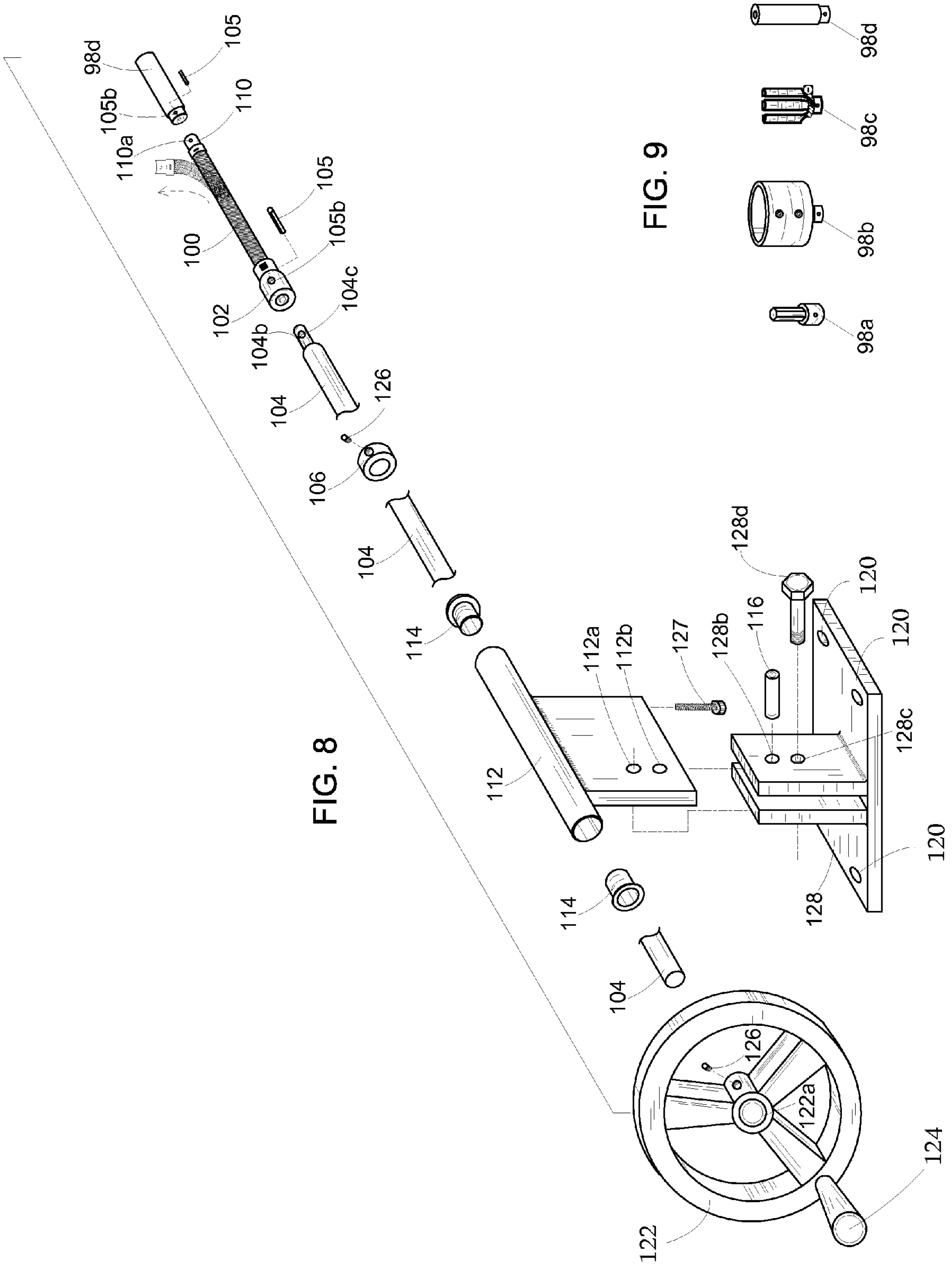
FIG. 8 is an exploded perspective view of the present embodiment.
FIG. 9 is a perspective group view of a variety of interchangeable attachments of the present embodiment.

FIG. 8 is an exploded perspective view of the present embodiment. Starting at the right most side of the image and working left. The right most end of the threaded attachment 98*d*, have threads to couple to a complementary rotatable adjustment mechanism, suchlike the threaded stop rod 36 of FIG. 3. The left end of the threaded attachment 98*d* couple to the flexible extension attachment coupler 110 and is secured with spring pin 105 pressed into spring pin hole 105*b* through attachment coupler hole 110*a* until flush with external surface of threaded attachment 98*d*. Similarly, the left end of the flexible extension coupler 102 slips over right end of driving shaft 104 abutting against driving shaft shoulder 104*b* and secured with spring pin 105 pressed into spring pin hole 105*b* through driving shaft hole 104*c* until flush with external surface of flexible extension coupler 102. Stop collar 106 slips over driving shaft 104 and is secured with set screw 126 providing an adjustment to limit to and fro movement of the driving shaft 104. The bushing 114 presses into right and left end of rocker drive guide 112. The driving shaft 104 slides through the bore of the bushings 114 and out the left end of rocker drive guide 112 leaving sufficient exposure of left end of driving shaft 104 to slide into hand wheel hole 122*a* and secure assemble with set screw 126. Rocker drive guide 112 pivotally attaches to base mount 128. The pivot retainer pin 116 presses into base mount pivot hole 128*b* through rocker drive pivot hole 112*a* until flush with other side of base mount pivot hole 128*b*, not visible. Stop screw 127 adjustably threads into bottom end of rocker drive guide 112 adjustably limiting the pivotability of rocker drive guide 112 relative to base mount 128. The base mount holes 120 provide a fastening point for mounting to a stationary surface.

FIG. 9 is a perspective group view of a variety of interchangeable attachments of the present embodiment. Furthermore displaying a sampling, but not limited to interchangeable attachments that are substitutable with threaded attachment 98*d* of FIG. 8. Different brands and models of routers have various adjusters for adjusting the height of a router bit 90 of FIG. 1. FIG. 9 provides a sampling of attachment couplers. Hex attachment 98*a* provides attachability to height adjustments having a hexagonal connector. Similarly, cup attachment 98*b* provides attachability to height adjustments having a circular connector such as adjustment dial 27 of FIG. 4. Further, crimp attachment 98*c* provides attachability to height adjustments having a more undefined geometric shape such as valve handle 154 of FIG. 12. Furthermore, threaded attachment 98*d* provides attachability to height adjustments having a threaded connector such that of threaded attachment 98*d* of FIG. 2.

Figure 10:
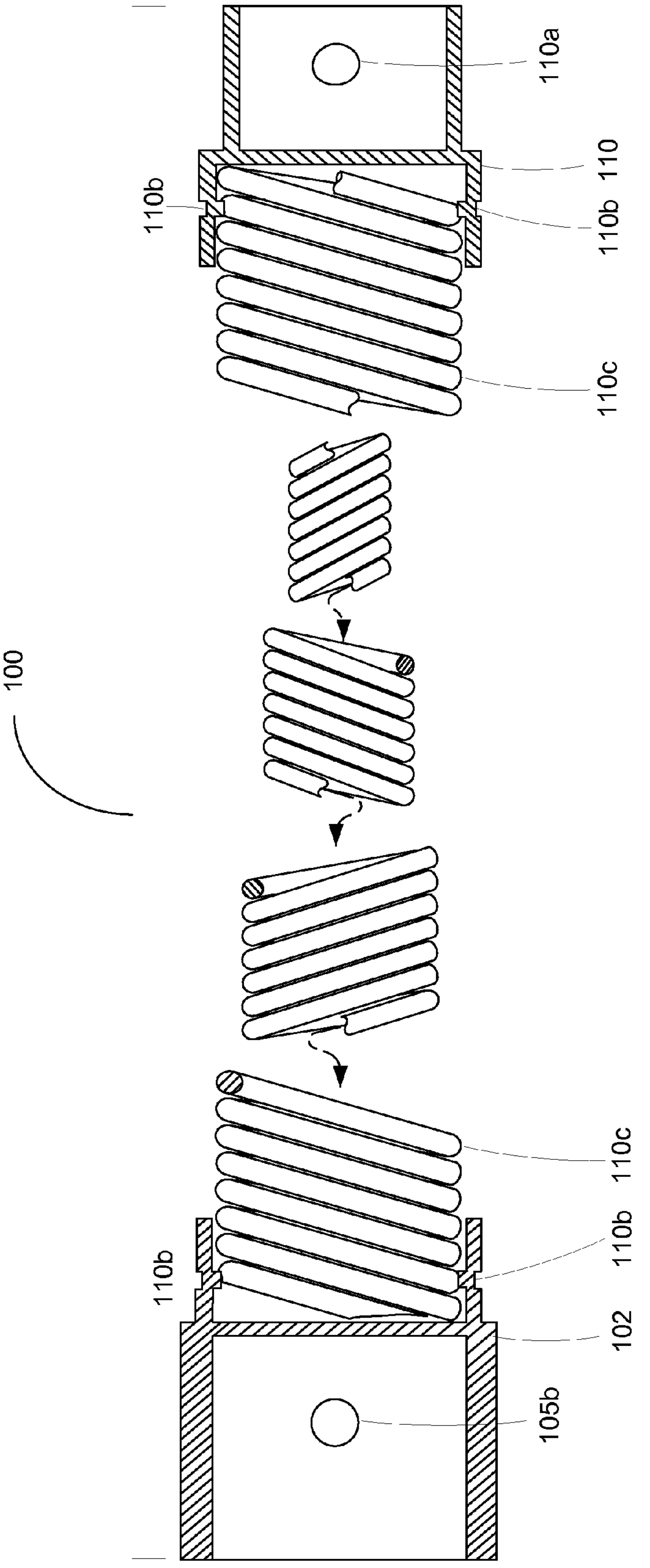
FIG. 10 is an exploded, partial cross sectional side view of the flexible extension attachment holder 100 of FIG. 8.

FIG. 10 is an exploded partial cross sectional side view of the flexible extension attachment holder 100 of FIG. 8, detailing the outer spiral wound shaft, enclosing succeedingly smaller diameter spiral wound shafts, wound counter directionally to preceding enclosing spiral shaft. Material is of sufficient wire spring quality to allow optimal multidirectional flexibility. This embodiment utilizing a slightly modified flexible extension bit holder commonly used by mechanics to access a fastener in an inconvenient location. Further, flexible extension attachment holder 100 has a crimp 110*b* on each end of flexible extension coupler 102 such that sufficient contact against spiral spring 110*c* forms a unified assembly. Furthermore, flexible extension attachment holder 100 has spring pin holes 105*b* on opposing ends of flexible extension attachment holder 100 to allow penetration of a spring pin 105 of FIG. 8.

Figure 11:
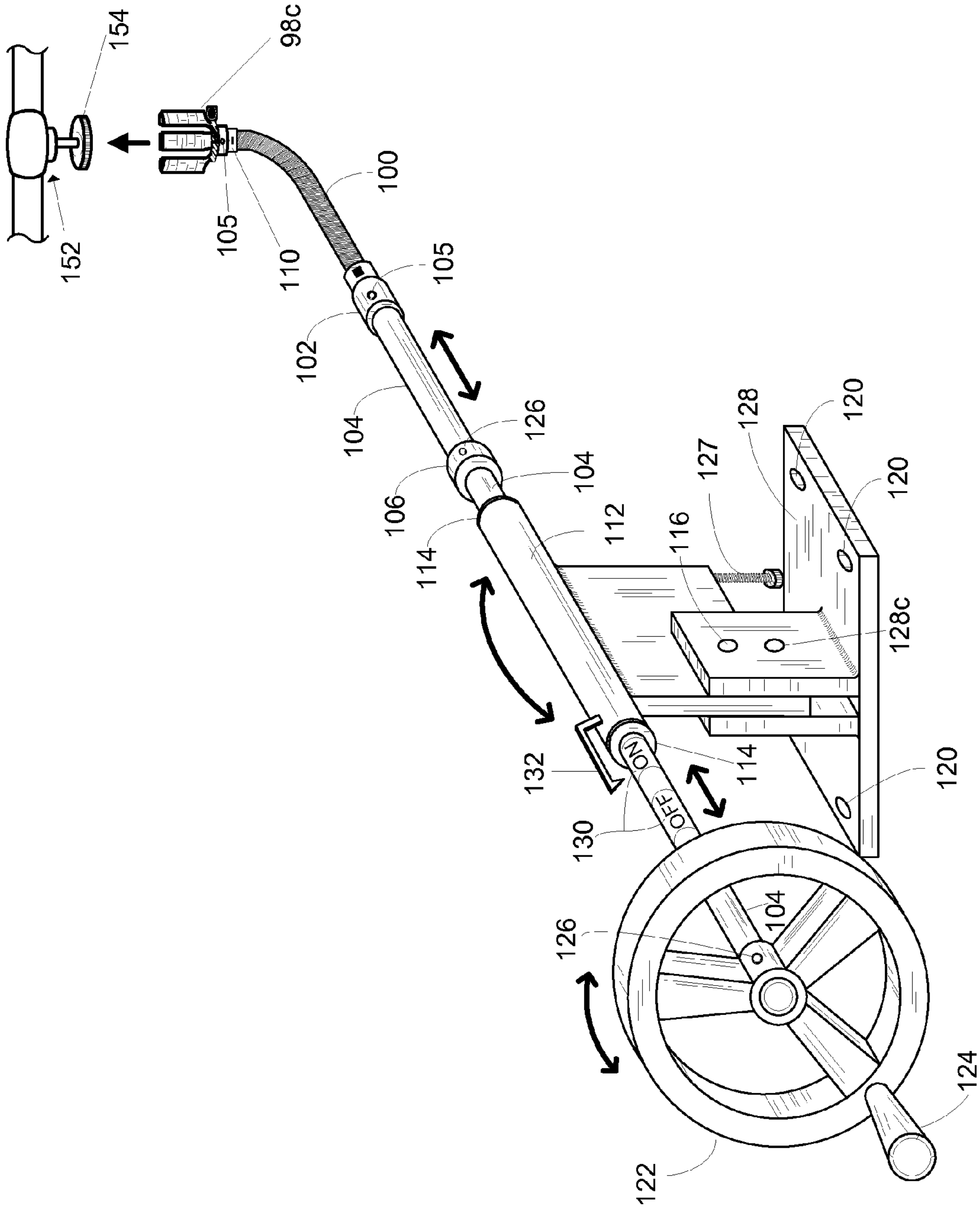
FIG. 11 is a perspective view of the present embodiment engaging a valve handle 154.

FIG. 11 is a perspective view of the present embodiment displaying the crimp attachment 98*c* connecting to a valve handle 154 of a valve 152 and having an indicia 130 and a pointer 132 to indicate position valve handle 154 is in relative to being turned on or turned off. It should be appreciated that the valve handle 154 commonly moves spirally up or down depending on the direction of rotation. Rotational movement of the hand wheel 122, driving shaft 104, flexible extension attachment holder 100, and crimp attachment 98*c* assembly engages the valve handle 154 providing the ability to regulate the flow within the valve 152. The spiraling up or down movement of the valve handle 154 during rotation results in the flexible extension attachment holder 100 bending as it twists accordingly, moving the attached driving shaft 104 sliding and rotating within the bushing 114 of the rocker drive guide 112 changing thereof. The resulting sliding motion of the driving shaft 104 within the rocker drive guide 112 forces the rocker drive guide 112 to pivot on the pivot retainer pin 116 relative to the base mount 128. The pivoting movement of the rocker drive guide 112 as the driving shaft 104 assembly rotates, results in a spiral movement of the hand wheel 122, driving shaft 104, flexible extension attachment holder 100, and crimp attachment 98*c* assembly moving to and fro within the encompassing rocker drive guide 112 resulting in the change in the position of the pointer 132 relative to the indicia 130.

Figure 12:
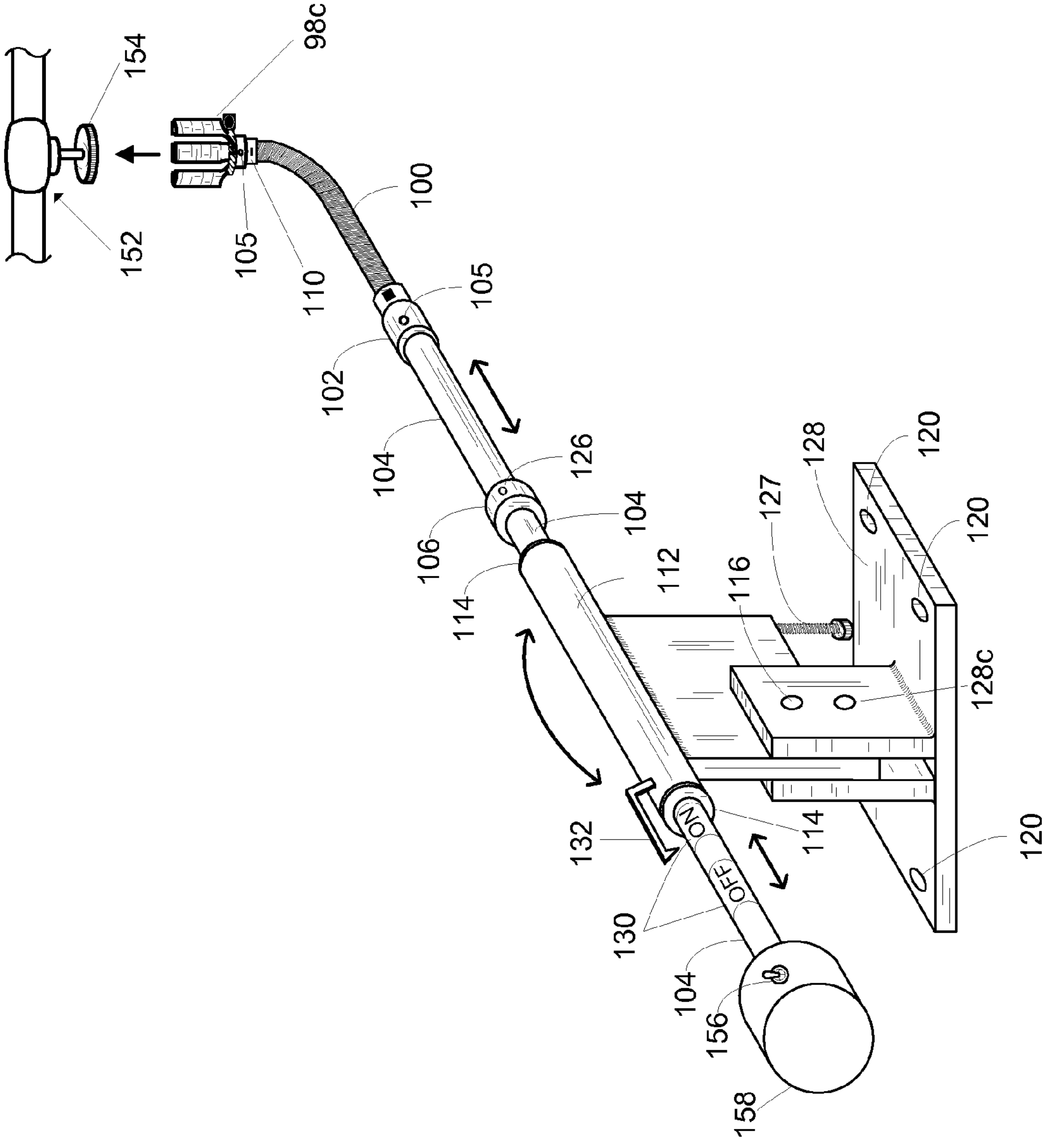
FIG. 12 is the same perspective embodiment as FIG. 11 substituting a motor 158 for the hand wheel 122 of FIG. 11.

FIG. 12 is the same perspective embodiment as FIG. 11 substituting a motor 158 for the hand wheel 122 of FIG. 11. The motor 158 would advantageously allow the operator of the embodiment to effortlessly rotate the driving shaft 104 under electrical power. Power may be provided through a standard electrical cord, a rechargeable battery embedded in the motor assembly, and the like without departing from the scope and spirit of the present invention. A toggle switch 156 is provided to allow reversing the direction of motor 158. The operator of the embodiment would grasp the motor 158 insuring positive transfer of rotational energy to the driving shaft 104 and subsequent interrelated parts.

Figure 13:
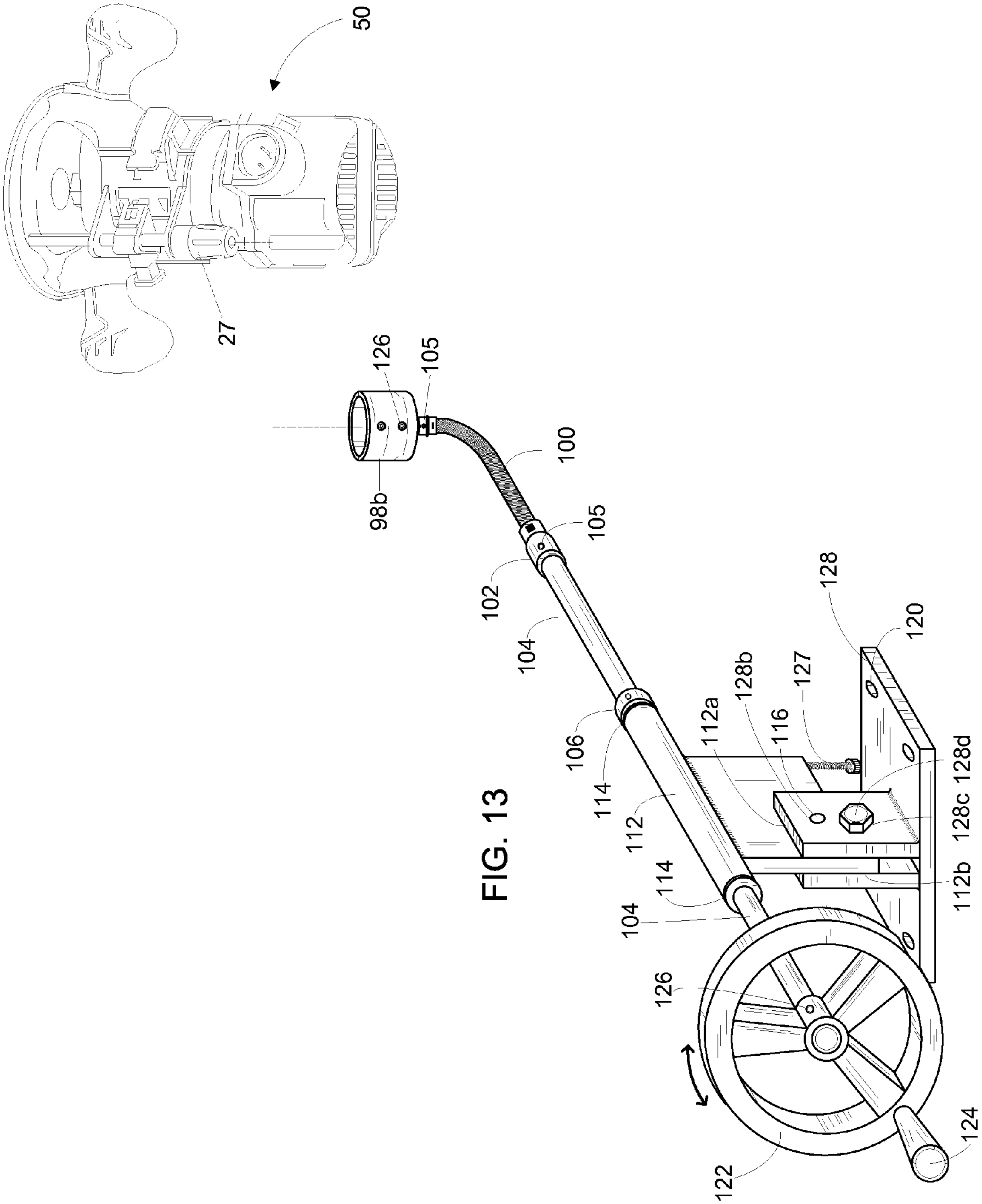
FIG. 13 is a perspective view of the present embodiment adapted for a fixed base standard router using optional stationary bolt 128*d*.

FIG. 13 is another perspective view similar to FIG. 6 of the present embodiment as it would appear on a standard router 50 mounted to a router table 92 (FIG. 3). Since many standard routers' adjustment dials 27 rotate without spiral movement, the rocker drive guide 112 and base mount 128 may not require hingeability of the rocker drive guide 112 nor the to and fro movement of the driving shaft 104. Properly adjusting the stop screw 127 to abut the base mount 128 and adjusting the stop collar 106 to abut the bushing 114 closest to it would prevent any unnecessary movement. However, the embodiment provides another option. The optional stationary bolt 128*d* fastened through base mount stationary hole 128*c*, not visible, and into the rocker drive stationary hole 112*b*, not visible, effectively makes the rocker drive guide 112 and base mount 128 function as a single unit thereby preventing any unnecessary hinging movement. Furthermore, FIG. 13 displays how the standard router's 50 adjustment dial 27 couples to cup attachment 98*b* and secured in place with set screws 126.

OPERATION

In operation (FIGS. 1, 2 and 3) on most plunge routers, one uses the rocker slide lift adjustment mechanism to raise and lower a router bit 90 relative to a router table top 84 (FIG. 3). The router bit 90 is mounted in a bit chuck 22 of a plunge router 52, mounted under a router table top 84. When installing the embodiment, the user mounts the embodiment's base mount 128 to a surface such as a router table shelf 150 securing the base mount 128 with mounting screws 120*a*. Furthermore replacing the lock nuts 40 (FIG. 1) with threaded attachment 98*d* (FIG. 3). The threaded attachment's 98*d* first end contacts the abutment member 38. Once mounted, raising the router bit 90 relative to the router table top 84 proceeds as follows:

1) The woodworker grasps the hand wheel handle 124 and rotates handle clockwise causing the interconnected assembly of components; hand wheel 122, driving shaft 104, stop collar 106, flexible extension coupler 102, flexible extension attachment holder 100, threaded attachment 98*d* to rotate clockwise in unison.
2) This rotation causes the threaded attachment 98*d* to engage the threaded stop rod's 36 threads, pushing against the abutment member 38. This movement guided by the plunge rods 26 of the router causes the housing 20 to approach the base 24 of the router.
3) Since the sub-base component 28 of the router is secured to the underside of the router table top 84 with the table mounting brackets 108; movement upward of the plunge router 52 housing 20 causes the bit chuck 22 which secures the router bit 90 to protrude further upward through the router table opening 88.
4) Once the proper depth of the router bit 90 exposure is set above the router table top 84, the user then guides the material; usually wood, across the top of the table top 84 into the router bit 90; optionally guided by the router table fence 86. The router bit 90 cuts the material to the depth of the router bit 90 relative to the router table top 84.
5) When less protrusion of the router bit 90 is desired relative to the table top 84, rotating the hand wheel 122 counter-clockwise causes the bit to retract through the table opening 88.

When adjusting the routers' depth, the flexible extension attachment holder 100 will bend to different angles relative to the base 24. The bending causes the interconnected driving shaft 104 to change its angle too. To adjust for the change in angle, as the interconnected parts are rotated, the rocker drive guide 112 allows the driving shaft 104 to slide to and fro within the bushing 114 while also allowing the driving shaft 104 to rotate within the rocker drive guide 112 bushing 114. Additionally, the rocker drive guide 112 can pivot on the pivot retainer pin 116 (much like a teeter-totter). The pivot retainer pin 116 couples the base mount 128 and rocker drive guide 112 together. This rotating, pivoting and sliding action prevents any binding of the driving shaft 104 while adjustments are being made. The rocking action of the rocker drive guide 112 can be adjusted with the stop screw 127. The closer the stop screw 127 is to the base mount 128 the less rocking action will take place or eliminated altogether, as might be needed when using a standard router 50. In addition to reducing or eliminating the movement of the rocker drive guide 112, the stop screw 127 serves to help eliminate the chances of the threaded attachment 98*d* from disengaging the threaded stop rod 36 when using the threaded attachment 98*d* by reducing the rocking action of the rocker drive guide 112.

To prevent the threaded attachment 98*d* from disengaging the threaded stop rod 36, a stop collar 106 is provided. The stop collar 106 is secured to the driving shaft 104 with a set screw 126. The stop collar 106 is adjusted to contact the nearest end of the rocker drive guide 112, just before the threaded attachment 98*d* disengages the threaded stop rod 36. In addition the stop collar 106 adjustably reduces the to and fro movement to the driving shaft 104.

In operation (FIGS. 6, and 13) of most standard fixed base routers, also known as standard routers 50. Due to their stationary fixed base design, do not require any to and fro movement of the driving shaft 104, nor any rocking action of the rocker drive guide 112 once embodiment is installed. Therefore the stop collar 106 is adjusted to abut the nearest bushing 114 and the stop screw 127 is adjusted to abut the base mount 128 thereby eliminating any to and fro movement of the driving shaft 104 and any rocking action of the rocker drive guide 112. Optionally (FIG. 13), to prevent any hinging movement of the rocker drive guide 112 relative to the base mount 128, the optional stationary bolt 128*d* fastened through base mount stationary hole 128*c* and into the rocker drive stationary hole 112*b*, effectively makes the rocker drive guide 112 and base mount 128 function as a single unit thereby preventing any unnecessary hinging movement. The driving shaft 104 can be in the form of a steel rod.

CONCLUSION, RAMIFICATIONS AND SCOPE

While the embodiment is illustrated and described herein in connection with a Hitachi Model M12V plunge router 52 (FIG. 1), the embodiment is applicable to many other plunge routers and standard routers including, for example, and without excluding others, routers marketed by Porter Cable, Makita, Sears Craftsman, Black & Decker, Ridgid, Freud, and DeWalt. These and other modifications of the embodiment disclosed herein as well as other embodiments will be obvious or suggested to those skilled in the art from the disclosure herein, whereby the foregoing descriptive matter is to be interpreted merely as illustrative of the present embodiment and not as a limitation.

Further, it is understood that the specific order of hierarchy of steps in the methods disclosed are examples of exemplary approaches. Based upon design preferences, it is understood that the specific order of hierarchy of steps in the method can be rearranged while remaining within the scope of the present invention. The accompanying method claims present elements of the various steps in a sample order, and are not meant to be limited to the specific order of hierarchy presented.

It is believed that the apparatus and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

I claim:

1. A rocker slide lift for adjusting the depth of a router bit by rotating a rotatable adjustment mechanism comprising:

(a) an attachment having a first end and a second end, said first end of said attachment having means for coupling to said rotatable adjustment mechanism, (b) a flexible extension attachment holder having a first end and a second end, said first end of said flexible extension attachment holder having means for coupling to said second end of said attachment, (c) a driving shaft having a first end and a second end, said first end of said driving shaft having means for coupling to said second end of said flexible extension attachment holder, (d) a rotational energy source having means for coupling to said second end of said driving shaft thereon, (e) a rocker drive guide having a bottom side and a bore extending through a first end thereof and out a second end thereof; said bore encircling said driving shaft therein;

(f) a base mount having a top side and a bottom side, said top side of said base mount having means to couple stationarily to said bottom side of said rocker drive guide, said bottom side of said base mount having means to mount the base mount to a surface so as to be stationary;

whereby upon urging of said rotational energy source, thereby rotational energy is transferred to rotate said driving shaft, slidably retained within said bore of said rocker drive guide, to rotate said flexible extension attachment holder, to rotate said attachment, to rotate said rotatable adjustment mechanism respectively, thereby displacing the depth of said router bit.

2. The rocker slide lift in accordance of claim 1, wherein said rocker drive guide has means to allow the driving shaft to slide to and fro and rotate within said rocker drive guide's bore upon the urging of said rotational energy source.

3. The rocker slide lift in accordance of claim 1, wherein the top side of the base mount is coupled to the bottom side of the rocker drive guide via means to couple said top side of the base mount hingeably to said bottom side of said rocker drive guide.

4. The rocker slide lift in accordance of claim 1, wherein the means to stationarily couple the top side of the base mount to the bottom side of the rocker drive guide includes a fastening arrangement.

5. The rocker slide lift in accordance of claim 1, wherein an amount of said second end of said driving shaft extends from said rocker drive guide, leaving a length of said second end of said driving shaft exposed, the means for coupling the rotational energy source to said second end of said driving shaft being located on a portion of the extended amount of the driving shaft.

6. The rocker slide lift in accordance of claim 5, wherein said rotational energy source includes a hand wheel coupled to said second end of said driving shaft.

7. The rocker slide lift in accordance of claim 5, wherein said rotational energy source includes a motor coupled to said second end of said driving shaft.

8. The rocker slide lift in accordance of claim 1, wherein said bottom side, near said first end of said rocker drive guide thereof, further includes a stop screw threaded therein, abutting said top side of said base mount, thereby adjustably limiting hingeability of said rocker drive guide.

9. The rocker slide lift in accordance of claim 1, wherein a bore of a stop collar adjustably encircles said driving shaft thereon, between said first end of said rocker drive guide and said first end of said driving shaft, thereby limiting to and fro movement of said driving shaft.

10. The rocker slide lift in accordance of claim 1, wherein said driving shaft comprises a steel rod.

11. The rocker slide lift in accordance of claim 1, wherein said top side of said base mount is coupled to said bottom side of said rocker drive guide by a pivot retainer pin to hingeably secure said rocker drive guide to said top side of said base mount.

12. The rocker slide lift in accordance of claim 1, wherein said driving shaft further includes indicia.

13. The rocker slide lift in accordance of claim 12, wherein said rocker drive guide further includes a pointer pointing to said indicia.

14. The rocker slide lift in accordance of claim 13, wherein movement of said driving shaft within said rocker drive guide changes the location of said pointer relative to said indicia.

15. The rocker slide lift in accordance of claim 1, wherein said attachment is selected from one of a hex attachment, a cup attachment, a crimp attachment, or a threaded attachment to facilitate use with a variety of said rotatable adjustment mechanisms.

16. The rocker slide lift in accordance of claim 1 wherein said rotatable adjustment mechanism includes a threaded stop rod and an adjustment dial on a router.

17. An apparatus for adjusting the depth of a router bit by rotating a rotatable adjustment mechanism comprising:

(a) an attachment having a first end and a second end, said first end of said attachment having a shape for coupling to said rotatable adjustment mechanism, (b) a flexible extension attachment holder having a first end and a second end, said first end of said flexible extension attachment holder coupled to said second end of said attachment, (c) a driving shaft having a first end and a second end, said first end of said driving shaft coupled to said second end of said flexible extension attachment holder, (d) a rotational energy source coupled to said second end of said driving shaft thereon, (e) a rocker drive guide having a bottom side and a bore extending through a first end and out a second end of said rocker drive guide; said bore encircling said driving shaft therein such that the driving shaft is slideable and rotatable therein;

(f) a base mount having a top side and a bottom side; said top side of said base mount hingeably coupled to said bottom side of said rocker drive guide; said bottom side of base mount mounted stationary to a surface; and (g) a means to stationarily couple said top side of said base mount to the bottom side of said rocker drive guide;

wherein said rotational energy source is coupled to rotate said driving shaft, which is coupled to rotate said flexible extension attachment holder, which is coupled to rotate said attachment, and said rocker drive guide is pivotably hinged to said base mount via the hingeable coupling, and said means to stationarily couple said top side of said base mount to the bottom side of said rocker drive guide is engaged between the base mount and the rocker drive guide when it is desired to prevent said rocker drive guide from pivoting relative to said base mount.

18. An apparatus for adjusting the depth of a router bit as set forth in claim 17, wherein said attachment is selected from one of a hex attachment, a cup attachment, a crimp attachment, or a threaded attachment to facilitate use with a variety of shapes of said rotatable adjustment mechanism.

* * * * *